United States Patent
Sharkar et al.

(10) Patent No.: US 12,240,534 B2
(45) Date of Patent: Mar. 4, 2025

(54) WORK VEHICLE

(71) Applicant: KUBOTA CORPORATION, Osaka (JP)

(72) Inventors: Fahmid Sharkar, Atlanta, GA (US); Nicholas Allicock, Suwanee, GA (US); Michael Anderson, Cleveland, GA (US); Logan Hayes, Dawsonville, GA (US); Jeremy May, Gainesville, GA (US)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 17/730,760

(22) Filed: Apr. 27, 2022

(65) Prior Publication Data

US 2023/0347990 A1 Nov. 2, 2023

(51) Int. Cl.
*B62D 33/037* (2006.01)
*B62D 33/02* (2006.01)
*B62D 33/027* (2006.01)

(52) U.S. Cl.
CPC ....... *B62D 33/037* (2013.01); *B62D 33/0207* (2013.01); *B62D 33/027* (2013.01)

(58) Field of Classification Search
CPC .. B62D 33/02; B62D 33/027; B62D 33/0207; B62D 33/0222; B62D 33/0273; B62D 33/03; B62D 33/037
See application file for complete search history.

(56) References Cited

U.S. PATENT DOCUMENTS

| | | | | |
|---|---|---|---|---|
| 2,731,292 | A * | 1/1956 | Cole | B62D 33/0207 62/DIG. 1 |
| 2,856,225 | A * | 10/1958 | Selzer | B62D 33/08 296/13 |
| 5,071,185 | A * | 12/1991 | Schiele | B60P 3/42 410/121 |
| 5,997,067 | A * | 12/1999 | Shambeau | B62D 33/037 296/57.1 |
| 6,152,510 | A * | 11/2000 | Newsome | B62D 33/023 296/10 |
| 8,740,277 | B1 * | 6/2014 | Al-Qahtani | B62D 33/0207 296/3 |
| 9,187,023 | B2 | 11/2015 | Takahashi et al. | |
| 9,731,775 | B1 * | 8/2017 | Tsumiyama | B60R 9/065 |
| 2001/0024046 | A1 * | 9/2001 | Mizuta | B62D 33/037 296/57.1 |
| 2007/0216195 | A1 | 9/2007 | Furman | |

(Continued)

*Primary Examiner* — Gregory A Blankenship
(74) *Attorney, Agent, or Firm* — Greenblum & Bernstein, P.L.C.

(57) ABSTRACT

A work vehicle includes: a carrier box including: a floor panel; a pair of left and right side panels; and a rear gate supported by the floor panel in such a manner as to be capable of being opened and closed, the side panels being provided with an engagement section to which a height extension is detachably attachable, the rear gate including: a first panel connected with the floor panel in such a manner as to be movable rotationally; and a second panel connected with the first panel in such a manner as to be movable rotationally, wherein attaching the height extension to the engagement section and positioning the second panel over the first panel provides an additional height for both of the side panels and the rear gate.

1 Claim, 10 Drawing Sheets

(56) References Cited

U.S. PATENT DOCUMENTS

| | | | |
|---|---|---|---|
| 2013/0094930 A1* | 4/2013 | Kalergis | B60P 1/435 |
| | | | 296/183.1 |
| 2014/0183882 A1* | 7/2014 | Kaku | E05C 19/10 |
| | | | 292/281 |
| 2015/0015018 A1* | 1/2015 | Lee | B60P 1/26 |
| | | | 296/36 |
| 2016/0090130 A1* | 3/2016 | Nakao | B60N 2/10 |
| | | | 296/26.08 |
| 2016/0200374 A1* | 7/2016 | Yamamoto | E05B 65/006 |
| | | | 292/100 |
| 2017/0361756 A1* | 12/2017 | Marchlewski | B62D 33/023 |
| 2019/0106160 A1* | 4/2019 | Roberts | B62D 33/0207 |
| 2019/0106161 A1* | 4/2019 | Sauter | B62D 33/0273 |
| 2019/0210664 A1* | 7/2019 | Williams | B60P 7/14 |
| 2021/0086843 A1 | 3/2021 | Ishii et al. | |
| 2022/0024525 A1* | 1/2022 | Staser | B62D 33/0276 |
| 2022/0063734 A1* | 3/2022 | Pacella | B62D 33/027 |
| 2022/0105861 A1* | 4/2022 | Murray | B62D 33/0273 |
| 2022/0136297 A1* | 5/2022 | Roberson | B60N 3/00 |
| | | | 49/37 |
| 2022/0194288 A1* | 6/2022 | Allicock | B60P 1/435 |
| 2022/0355881 A1* | 11/2022 | Sidwell | B62J 35/00 |
| 2022/0410781 A1* | 12/2022 | Itou | B60P 1/28 |
| 2023/0118953 A1* | 4/2023 | Salter | B62D 33/0207 |
| | | | 224/405 |
| 2023/0192200 A1* | 6/2023 | Lehti | B62D 33/037 |
| | | | 49/70 |

* cited by examiner

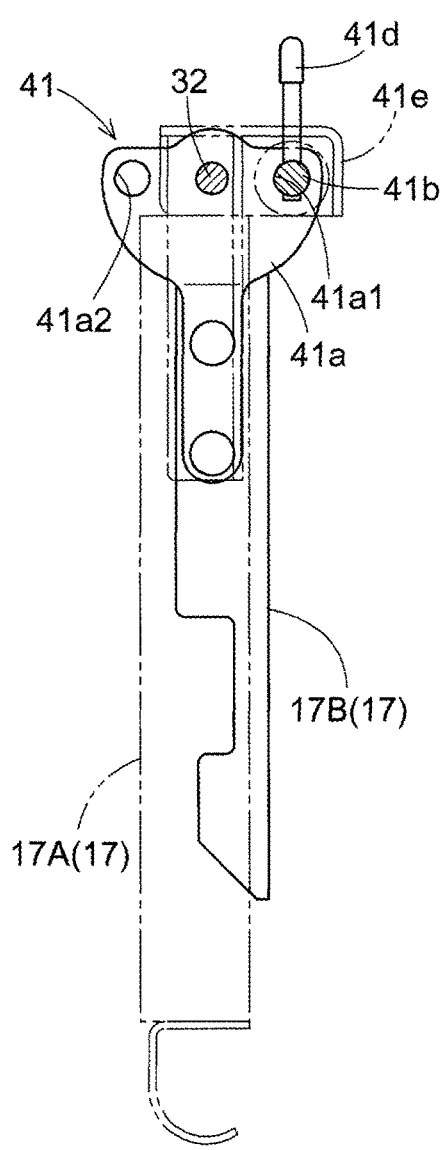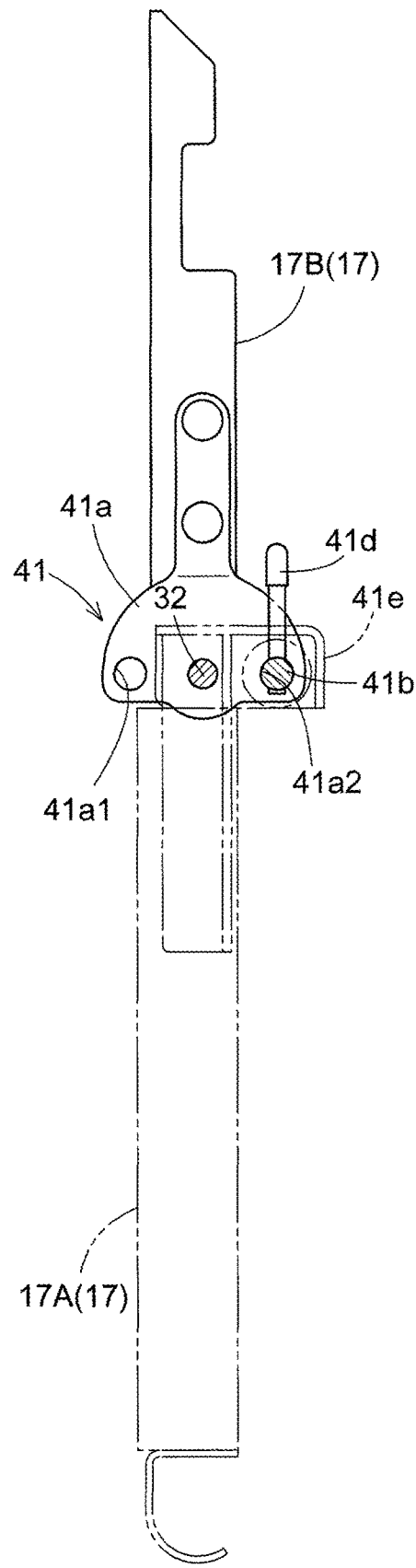

Fig.10A
Fig.10B
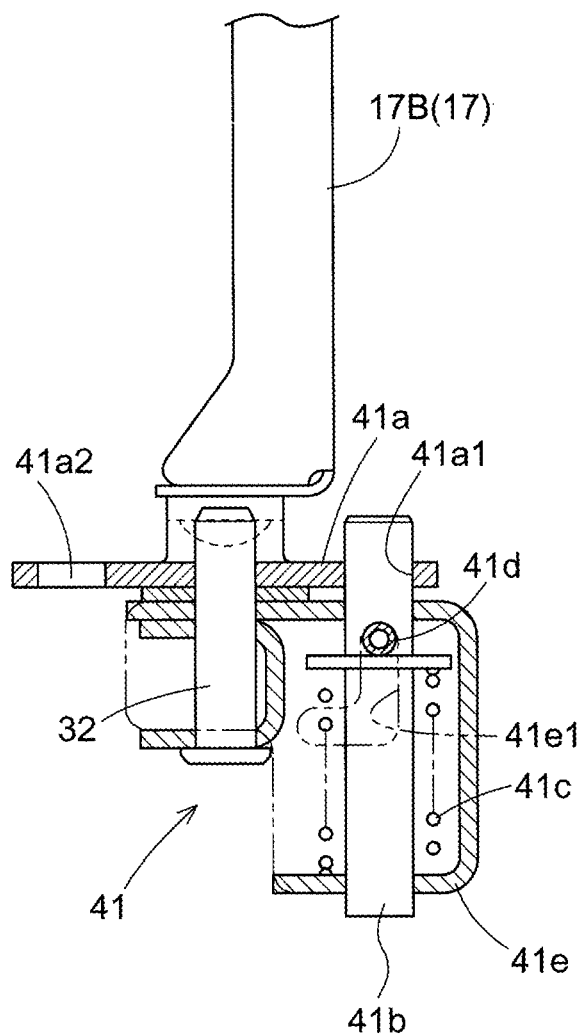
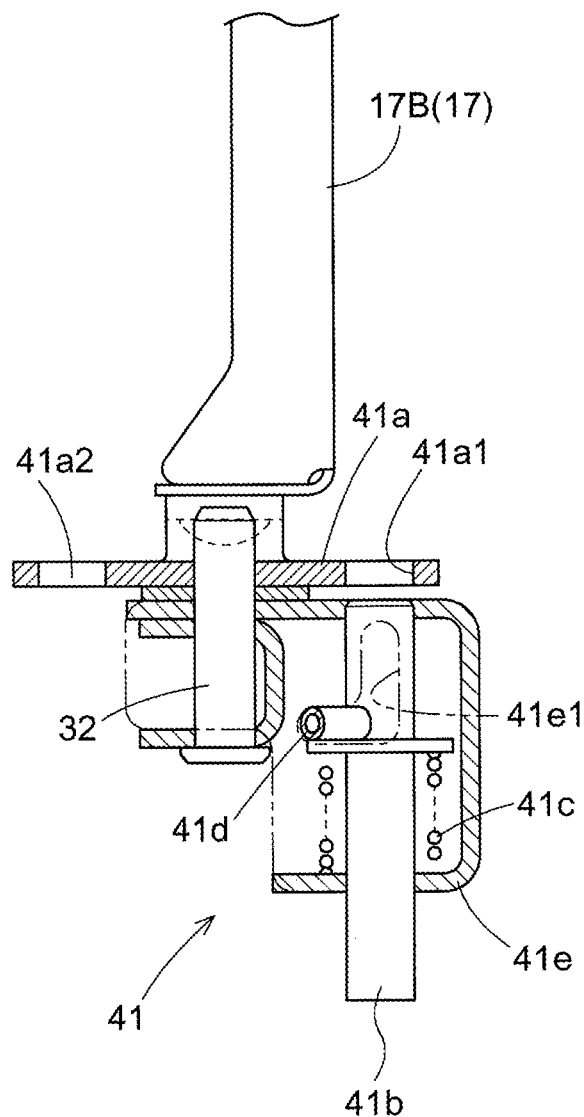

WORK VEHICLE

TECHNICAL FIELD

The present disclosure relates to a work vehicle such as a utility terrain vehicle (UTV) including a body with a carrier box.

BACKGROUND ART

UTVs are used as four-wheel drive off-road vehicles for multiple purposes such as farmwork and transportation. A UTV may include a carrier box switchable between a horizontal position and a slanted position with a front portion lifted in response to an operation of a dump cylinder.

US2021/0086843A1 and US2007/0216195A1, for example, each disclose a work vehicle in the form of a UTV including a carrier box with a rear gate disposed at the back end thereof and capable of being opened and closed. The work vehicle disclosed in US2021/0086843A1 includes a single handle outward of a central portion of the rear gate. The rear gate is structured such that a user facing the rear gate can pull the handle toward the user to unlock the rear gate. With the rear gate unlocked as such, the user can cause the rear gate to fall into a horizontal position, in which the carrier box can receive various objects as loaded thereon. The work vehicle disclosed in US2007/0216195A1 includes side panels each having insertion holes configured to receive a plate-shaped member as inserted.

SUMMARY OF INVENTION

Work for multiple purposes such as farmwork and transportation may involve loading a carrier box with tall objects such as straws and seedlings. The work vehicle disclosed in US2021/0086843A1 includes a carrier box with a limited capacity, and is used to transport only a portion of such tall objects at a time. The work vehicle disclosed in US2007/0216195A1, which includes side panels that allow for an additional height, may let a loaded object fall backward out of the carrier box, and does not allow the carrier box to have an increased capacity. The above circumstances have led to a demand for a work vehicle including a carrier box with a capacity changeable according to the type of load.

In view of the above, a work vehicle according to the present disclosure includes: a carrier box including: a floor panel; a pair of left and right side panels; and a rear gate supported by the floor panel in such a manner as to be capable of being opened and closed, the side panels being provided with an engagement section to which a height extension is detachably attachable, the rear gate including: a first panel connected with the floor panel in such a manner as to be movable rotationally; and a second panel connected with the first panel in such a manner as to be movable rotationally, wherein attaching the height extension to the engagement section and positioning the second panel over the first panel provides an additional height for both of the side panels and the rear gate.

BRIEF DESCRIPTION OF DRAWINGS

The present disclosure is further described in the detail description which follows, in reference to the noted plurality of drawings by way of non-limiting examples of exemplary embodiments of the present disclosure, in which like reference numerals represent similar parts throughout the several views of the drawings, and wherein:

FIG. 9A is a side view of a first lock mechanism with a second panel facing a first panel.

FIG. 9B is a side view of a first lock mechanism with a rear gate having an additional height.

FIG. 10A is a cross-sectional view of a first lock mechanism in a locking state.

FIG. 10B is a cross-sectional view of a first lock mechanism in a unlocking state.

DESCRIPTION OF EMBODIMENTS

Figure 1:
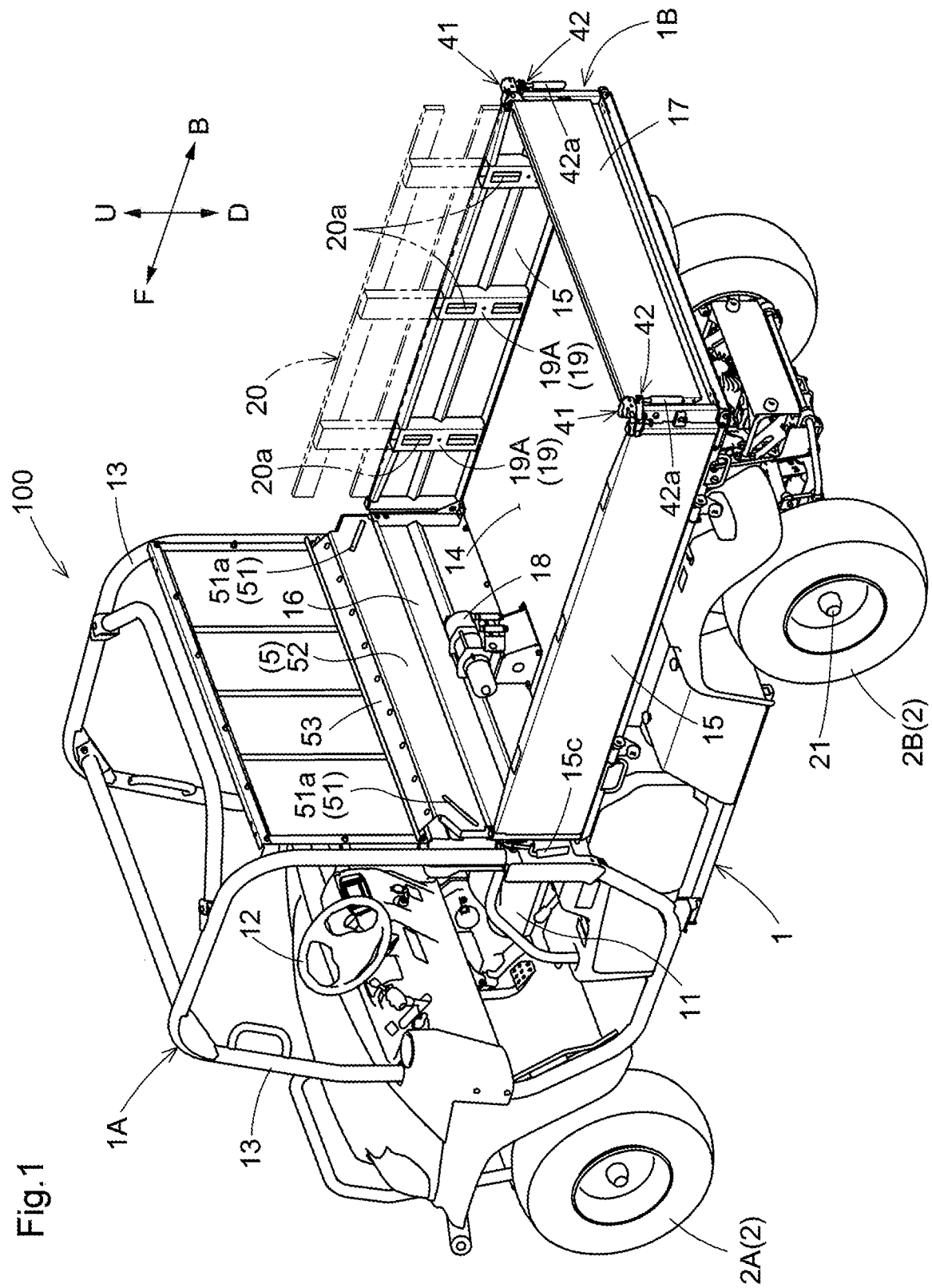
FIG. 1 is a view of a work vehicle in its entirety as viewed from obliquely backward.

The description below deals with a work vehicle as an embodiment of the present disclosure with reference to drawings. The present embodiment described below is, as an example work vehicle, a utility terrain vehicle (UTV) including a body with a carrier box. The present disclosure is, however, not limited to the embodiment below, and may be altered variously within its scope.

The description below uses terms such as "front" and "forward" to refer to the front side in the front-back direction of the body (indicated as "F" in the drawings), terms such as "back" and "backward" to refer to the back side in the front-back direction of the body (indicated as "B" in the drawings), terms such as "left-right direction" and "lateral" to refer to the horizontal direction perpendicular to the front-back direction of the body, terms such as "below" and "downward" to refer to the gravitational direction (indicated with "D" in the drawings), and terms such as "above" and "upward" to refer to the direction opposite to the gravitational direction (indicated with "U" in the drawings).

FIG. 1 illustrates a UTV 100 (which is an example of the "work vehicle") including a body 1 and four wheels 2 (namely, two front wheels 2A and two rear wheels 2B) each supported by the body 1 with a suspension in-between. The UTV 100 is a four-wheel drive vehicle configured such that the wheels 2 are drivable by a power source such as a motor and an internal combustion engine. The UTV 100 is usable for multiple purposes such as farmwork and transportation.

The body 1 is provided with a pair of left and right front wheels 2A at a front portion and a pair of left and right rear wheels 2B at a back portion. The body 1 includes a driver section TA backward of the front wheels 2A and a carrier box 1B backward of the driver section TA. The carrier box 1B is configured such that a front portion thereof is liftable for a slanted position in response to an operation of a dump cylinder (that is, the below-described fluid cylinder 31) to allow a load to be dumped backward by its self weight.

The driver section TA includes a driver's seat 11 for a driver to sit on and a steering wheel 12 positioned forward of the driver's seat 11 and operable to turn the front wheels 2A. The driver section TA further includes two ROPS frames 13 respectively at the left and right sides of the driver section TA to protect the driver and any other occupant in the event of a roll-over accident of the body 1.

The carrier box 1B is an open-top box including (i) a floor panel 14 as a bottom wall, (ii) a pair of left and right side panels 15 connected with respective lateral sides of the floor panel 14, (iii) a front panel 16 connected with the front end of the floor panel 14, and (iv) a rear gate 17 connected with the back end of the floor panel 14. The floor panel 14 is a rectangular plate. The side panels 15 are connected respectively with the entire lateral sides of the floor panel 14. The front panel 16 is connected with the entire front side of the floor panel 14. The rear gate 17 is connected with the entire back side of the floor panel 14. The carrier box 1B for the present embodiment has a large capacity. Approximately two-thirds or smaller of its area lies forward of the rear axle 21 for the rear wheels 2B, while approximately one-third or larger of the area lies backward of the rear axle 21.

For normal use, the floor panel 14, the side panels 15, and the front panel 16 are so fixed as to be unmovable relative to one another, and the rear gate 17 is movable rotationally about the back end of the floor panel 14 as a rotary shaft. The rear gate 17 is capable of being restricted in its backward movement with use of wires 34 hung between the respective side panels 15 and the rear gate 17 (see FIG. 8 as well). The side panels 15 are each provided with a lock member 15c unlockable to allow the corresponding side panel 15 to move rotationally outward relative to the front panel 16.

The carrier box 1B is provided with a winch 18 fixed to the floor panel 14 or the front panel 16 at a central position of the connection between the floor panel 14 and the front panel 16. The winch 18 is forward relative to the floor panel 14 to allow a largest possible load capacity for the carrier box 1B. The winch 18 as installed on the carrier box 1B is lower in position than the front panel 16 and the side panels 15. The winch 18 may alternatively be absent.

The side panels 15 are each fixed to the front panel 16 with use of a lock member 15c. The front panel 16 is fixed to the floor panel 14 with use of fastener members such as bolts. The front panel 16 is provided with a lighting section 5 including a light 51 configured to emit light backward and a support panel 52 detachably attached to the front panel 16 and supporting the light 51. The light 51 is at such a position on the lighting section 5 as to illuminate the winch 18. The light 51 is in the form of a pair of LED units 51a each including a plurality of linearly arranged LEDs (light emitting diodes). The LED units 51a are disposed at respective upper corners of the support panel 52, and each have an inclined arrangement. The light 51 does not necessarily include LEDs, and may be any illuminator.

The lighting section 5 includes an inclined plate 53 coupled to an upper portion of the support panel 52 with use of fastener members such as bolts and extending forward of the support panel 52. The inclined plate 53 extends across the gap between the driver section TA and the carrier box 1B (specifically, the front panel 16) and obliquely upward from the carrier box 1B toward the driver section TA. The inclined plate 53, which extends forward of the support panel 52 as described above, prevents an object in the carrier box 1B from falling into the gap in front of the front panel 16.

The side panels 15 are provided with an engagement section 19 to which a plate-shaped member 20 (which is an example of the "height extension") such as a wooden frame is detachably attachable. The engagement section 19 is in the form of a plurality of (six for the present embodiment) insertion hole forming members 19A which are provided for each of the side panels 15 and in each of which a protrusion 20a of a plate-shaped member 20 is insertable. The side panels 15 are each provided with insertion hole forming members 19A at least one of which is backward of the rear axle 21. The insertion hole forming members 19A are provided for the side panels 15 in left-right symmetry.

Figure 2:
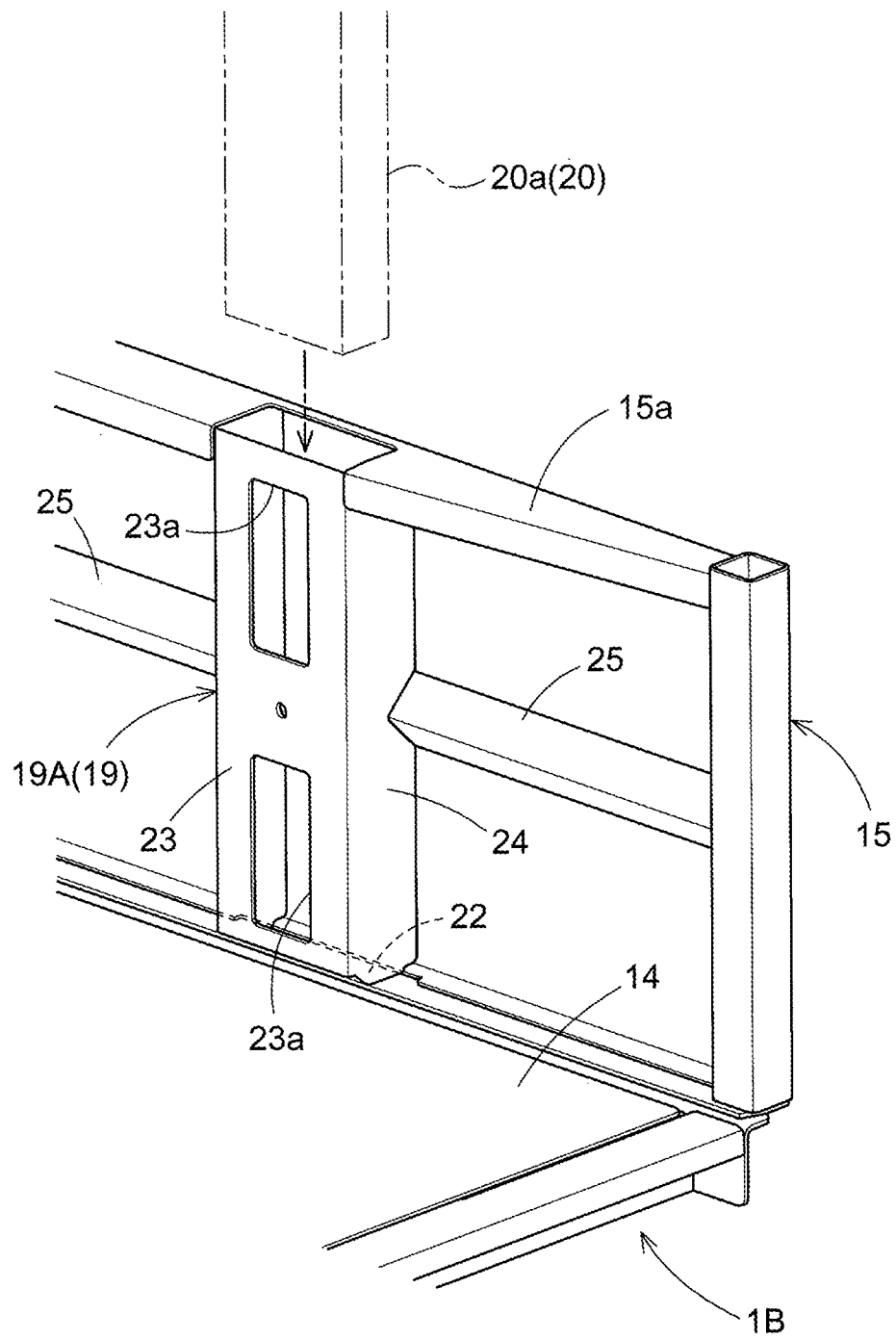
FIG. 2 is an enlarged perspective view of a portion of a side panel.

As illustrated in FIG. 2, the insertion hole forming members 19A each include a bottom wall 22 facing the floor panel 14, a facing wall 23 facing the corresponding side panel 15, and a pair of side walls 24 each connecting the facing wall 23 with the corresponding side panel 15. Providing the insertion hole forming members 19A for the side panels 15 allows each side panel 15 to have openings at a top wall 15a that are configured to receive the protrusions 20a of a plate-shaped member 20 as inserted. The bottom wall 22 is connected with the corresponding one of the left and right end portions of the floor panel 14. The facing wall 23 has rectangular through holes 23a each configured to receive a partition plate as inserted (not illustrated in the drawings) that is configured to partition the space of the carrier box 1B. The insertion hole forming members 19A each have a plurality of (two for the present embodiment) through holes 23a arranged in the up-down direction. The side panels 15 are each provided with ribs 25 each in the shape of an angular pipe. The ribs 25 are arranged and oriented in the front-back direction of each side panel 15 at a central position of the side panel 15 in its up-down direction. The ribs 25 each connect a side wall 24 of an insertion hole forming member 19A with that side wall 24 of an adjacent insertion hole forming member 19A which faces the above side wall 24 in the front-back direction.

As illustrated in FIGS. 3A to 3D and 4, the rear gate 17 includes a first panel 17A connected with the floor panel 14 in such a manner as to move rotationally and a second panel 17B connected with the first panel 17A in such a manner as to move rotationally. The first panel 17A includes a first end 17Aa connected with the back end of the floor panel 14 in such a manner as to move rotationally and a second end 17Ab with which the second panel 17B is connected in such a manner as to move rotationally. The second panel 17B includes a third end 17Ba connected with the first panel 17A in such a manner as to move rotationally and a fourth end 17Bb as an open end.

Figure 4:
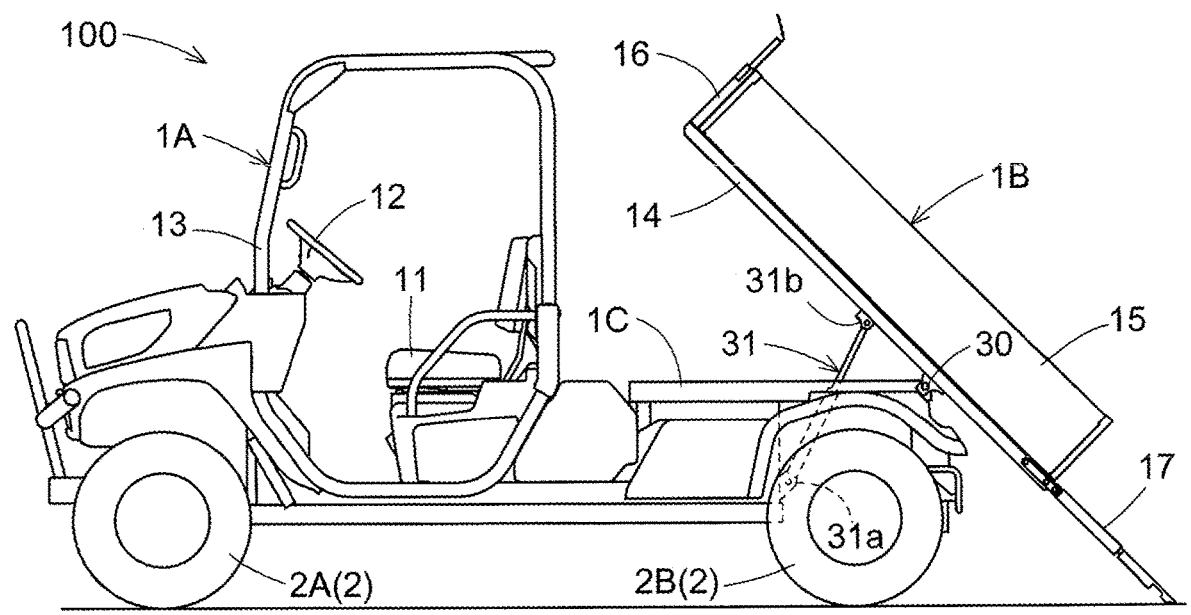
FIG. 4 is a side view of a work vehicle with a rear gate in a ramp position.

As illustrated in FIG. 4, the carrier box 1B is connected with a frame 1C of the body 1 with use of a hinge 30 in such a manner as to move rotationally. The hinge 30 connects the lower face of the floor panel 14 with the frame 1C. The floor panel 14 is capable of moving rotationally about the hinge 30 up to an angle of 45 degrees to 60 degrees relative to the frame 1C. The UTV 100 includes a fluid cylinder 31 configured to lift and lower the carrier box 1B relative to the frame 1C. The fluid cylinder 31 includes a first end 31a connected with the frame 1C and a second end 31b connected with the lower face of the floor panel 14.

Figure 3A:
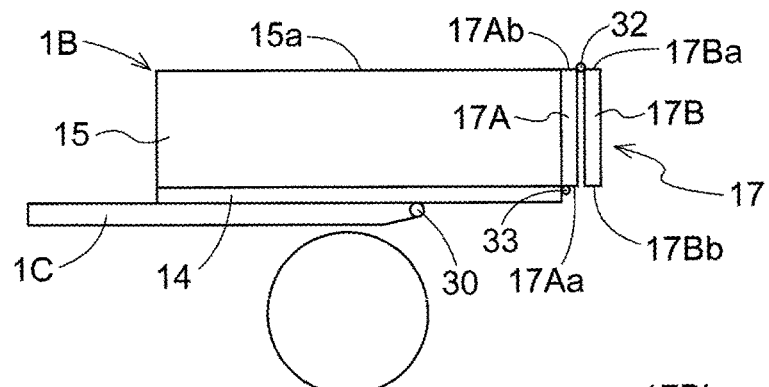
FIG. 3A is a diagram schematically illustrating a rear gate in a hold position during an operation of rotationally moving the rear gate.
Figure 3B:
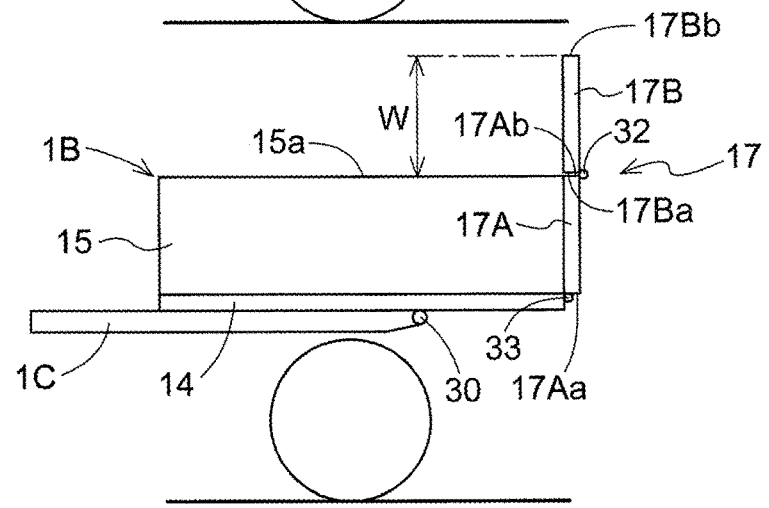
FIG. 3B is a diagram schematically illustrating a rear gate in an up position during an operation of rotationally moving the rear gate.
Figure 3C:
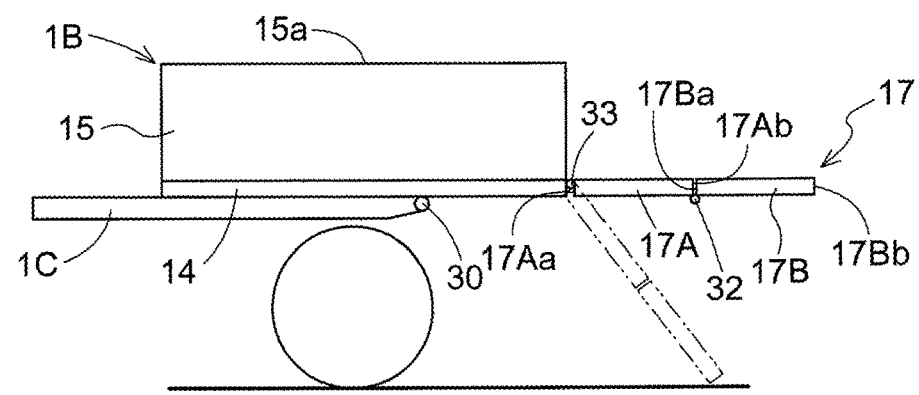
FIG. 3C is a diagram schematically illustrating a rear gate in a flat position during an operation of rotationally moving the rear gate.
Figure 3D:
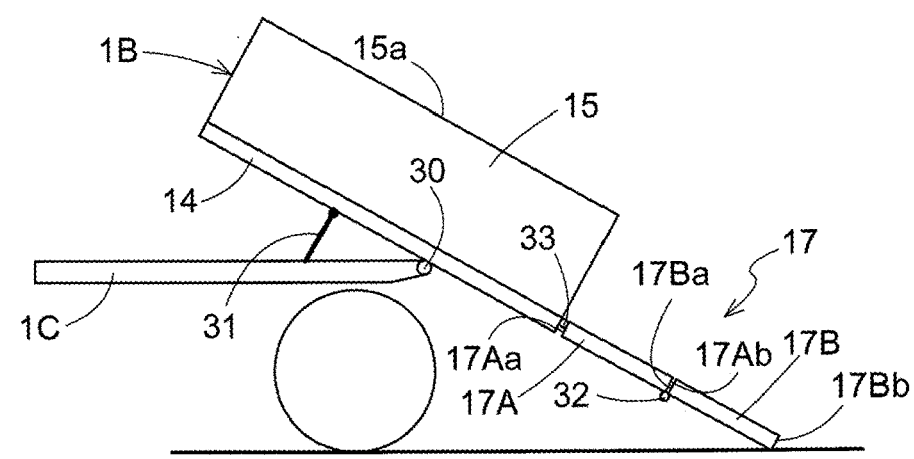
FIG. 3D is a diagram schematically illustrating a rear gate in a ramp position during an operation of rotationally moving the rear gate.

FIGS. 3A to 3D schematically illustrate how the rear gate 17 is moved rotationally. FIG. 3A illustrates a hold position, in which the rear gate 17 is folded into two (namely, the first panel 17A and the second panel 17B) and closes the back portion of the carrier box 1B. FIG. 3B illustrates an up position, in which the second panel 17B is over the first panel 17A so that the rear gate 17 has an additional height. FIG. 3C illustrates a flat position, in which the first panel 17A and the second panel 17B are aligned with the floor panel 14 and parallel to the ground surface. FIG. 3D illustrates a ramp position, in which the first panel 17A and the second panel 17B are aligned with the floor panel 14 and inclined to be close to the ground surface.

The hold position illustrated in FIG. 3A is such that the second end 17Ab and the third end 17Ba are at the same level as the respective top walls 15a of the side panels 15, while the first end 17Aa and the fourth end 17Bb are at the same level as the floor panel 14. In the hold position, in other words, the second end 17Ab and the third end 17Ba are above the first end 17Aa and the fourth end 17Bb.

The up position illustrated in FIG. 3B is such that the second panel 17B has been moved rotationally counterclockwise by 180 degrees about a first rotary shaft 32 from the hold position so that the second end 17Ab and the third end 17Ba face each other and that the fourth end 17Bb is above the third end 17Ba and separated therefrom by the panel width W. In the up position, in other words, the fourth end 17Bb is above the respective top walls 15a of the side panels 15, and the rear gate 17 closes the back portion of the carrier box 1B and has a height increased by the panel width W.

Figure 8:
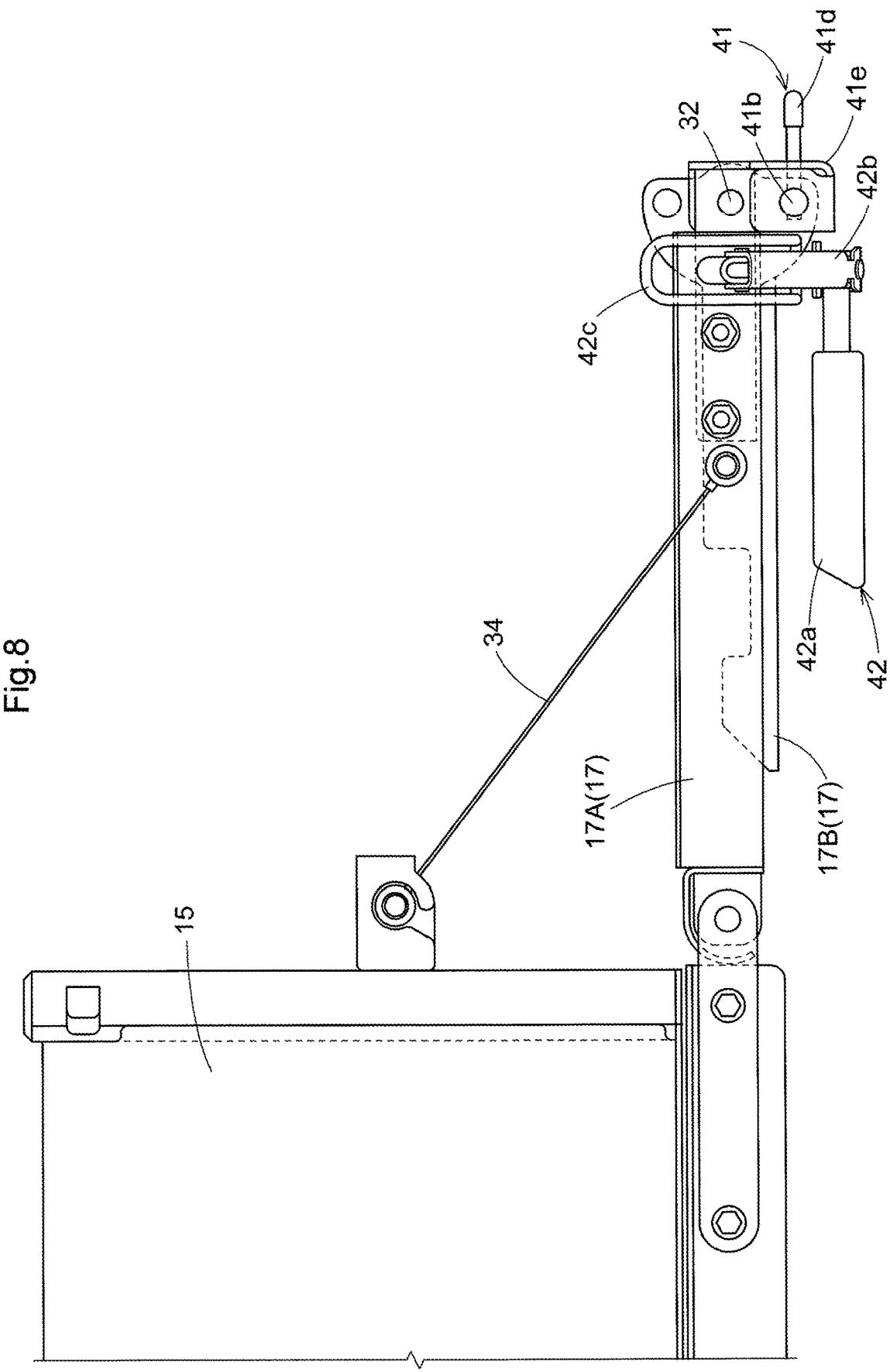
FIG. 8 is a side view of a rear gate having been moved rotationally outward.

The flat position illustrated in FIG. 3C is such that the first panel 17A and the second panel 17B have been moved rotationally clockwise by 90 degrees about a second rotary shaft 33 from the up position to be aligned with the floor panel 14. In the flat position, in other words, the fourth end 17Bb of the second panel 17B is below the respective top walls 15a of the side panels 15, and the back portion of the carrier box 1B is open. The flat position allows an object to be loaded onto the carrier box 1B from backward. The flat position may alternatively be such that as illustrated in FIG. 8, the first panel 17A and the second panel 17B have been moved rotationally clockwise by 90 degrees about the second rotary shaft 33 with the rear gate 17 folded into two.

The ramp position illustrated in FIG. 3D is such that the carrier box 1B has been moved rotationally about the hinge 30 from the flat position relative to the frame 1C with use of the fluid cylinder 31 to be so obliquely inclined that the carrier box 1B has a lifted front portion and that the fourth end 17Bb of the second panel 17B is close to the ground surface. In the ramp position, in other words, the fourth end 17Bb of the second panel 17B is below the frame 1C, and the back portion of the carrier box 1B is open. The ramp position allows an object to be pulled with use of the winch 18 onto the carrier box 1B. The carrier box 1B may additionally be in an intermediate position between the flat position illustrated in FIG. 3C and the ramp position illustrated in FIG. 3D. The intermediate position is, as indicated with double-dashed chain lines in FIG. 3C, such that the first panel 17A and the second panel 17B have been moved rotationally clockwise about the second rotary shaft 33 from the flat position so that the floor panel 14 is parallel to the ground surface and that the first panel 17A and the second panel 17B are inclined to be close to the ground surface.

Figure 5:
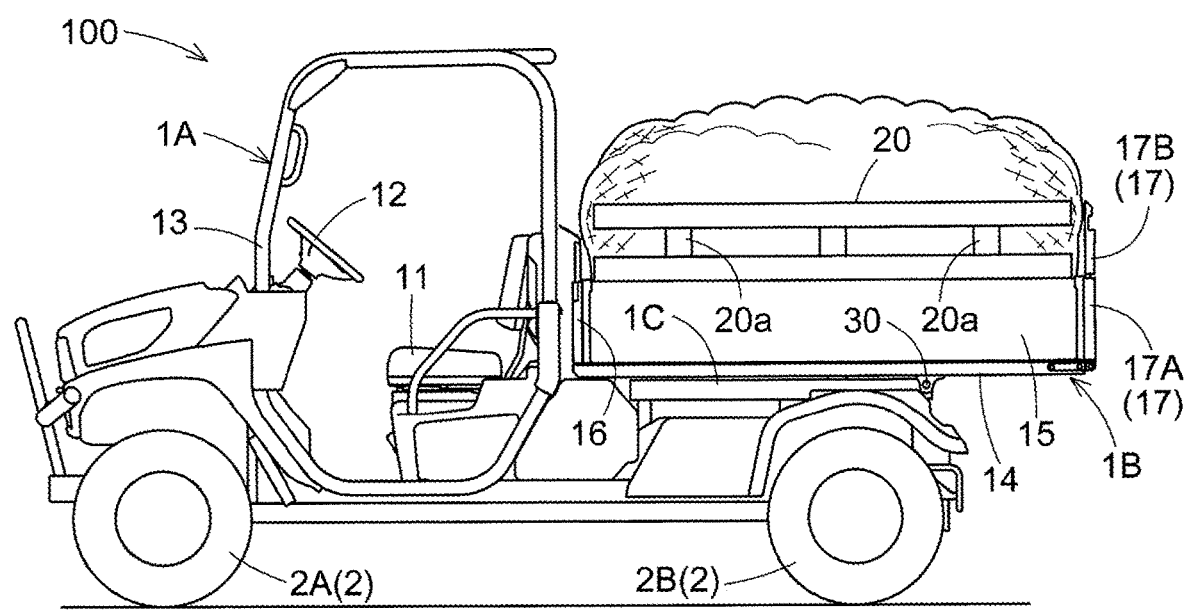
FIG. 5 is a side view of a work vehicle with a rear gate in an up position.

In the up position illustrated in FIG. 3B, in which the second panel 17B has been moved rotationally to be over the first panel 17A, simply attaching plate-shaped members 20 that are, for instance, prepared by the user to the engagement section 19 on the side panels 15 allows the carrier box 1B to have an increased capacity (see FIGS. 1 and 5 as well). This means that the above configuration allows the user to change the capacity of the carrier box 1B according to the type of load, thereby imparting greater convenience to the UTV 100. Further, the engagement section 19 is in the form of a plurality of insertion hole forming members 19A in each of which a protrusion 20a of a plate-shaped member 20 is insertable. The engagement section 19 is thus easily produced by simply fixing insertion hole forming members 19A to the side panels 15 of the carrier box 1B. In addition, the insertion hole forming members 19A on each side panel 15 include at least one insertion hole forming member 19A backward of the rear axle 21, thereby allowing the carrier box 1B to have a further increased capacity.

Figure 6:
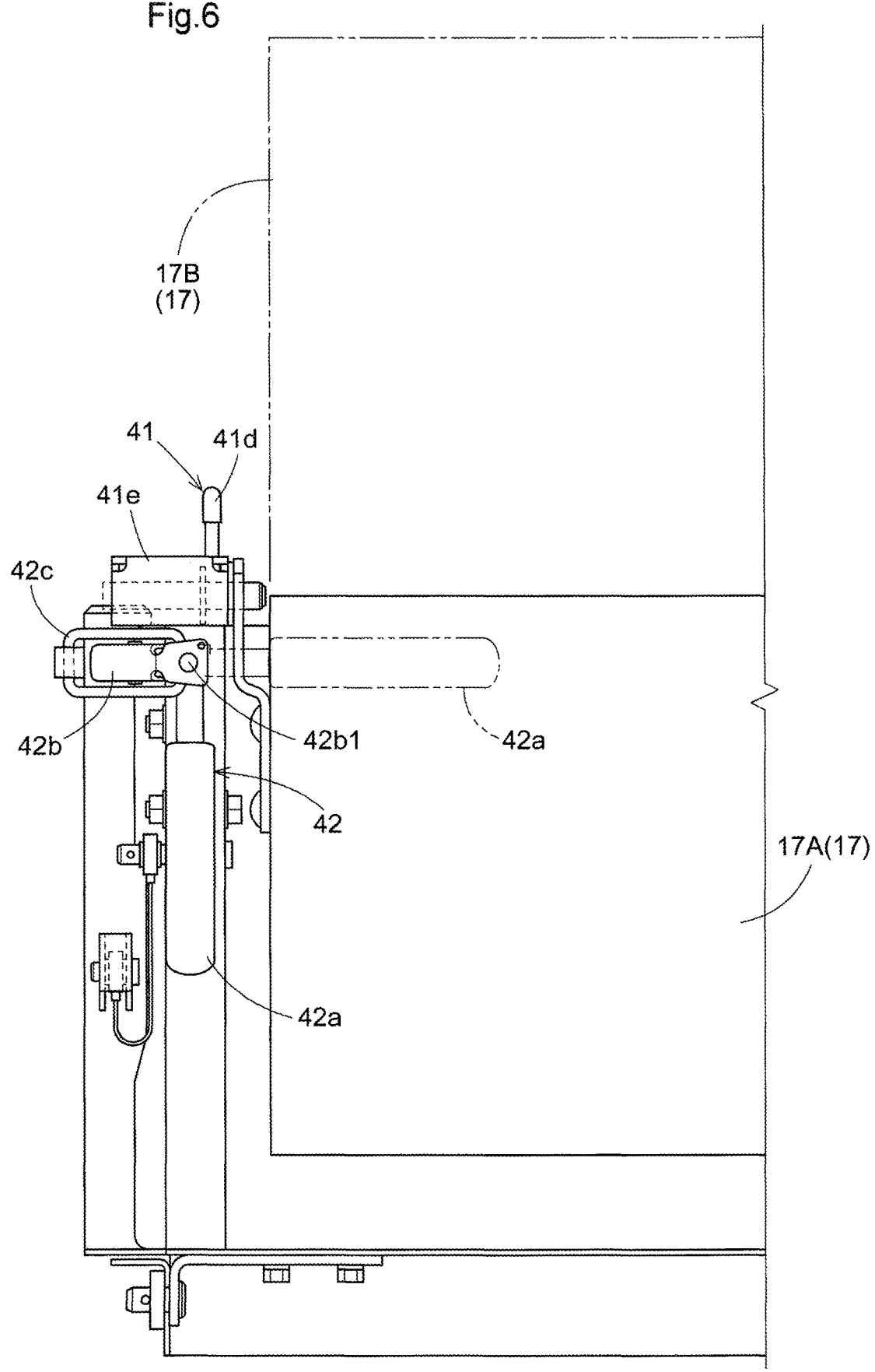
FIG. 6 is an enlarged rear view of a work vehicle with a rear gate in an up position.
Figure 7:
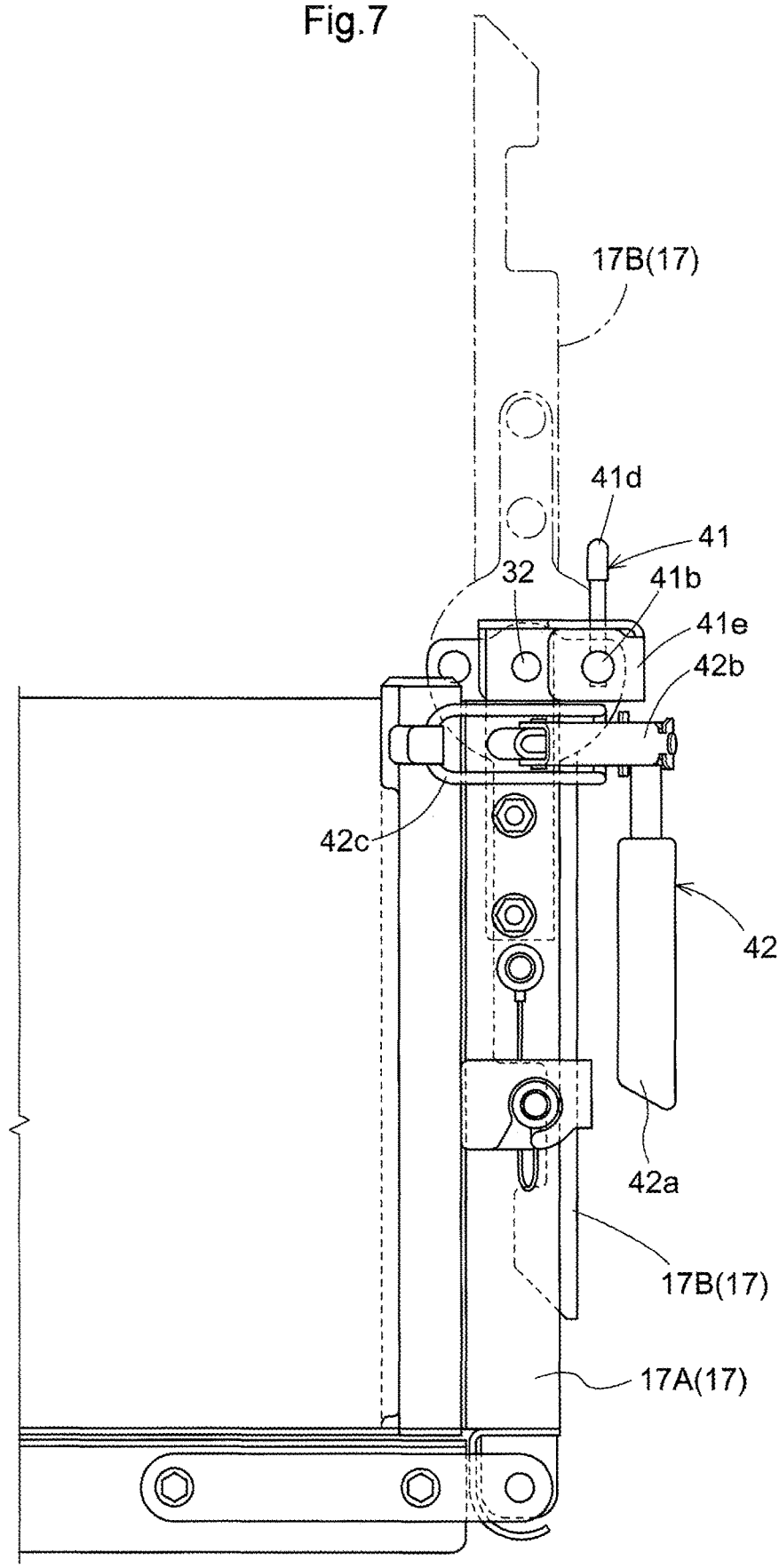
FIG. 7 is an enlarged side view of a work vehicle with a rear gate in an up position.

FIGS. 6 and 7 are an enlarged rear view and an enlarged side view respectively of the rear gate 17 in the up position illustrated in FIG. 3B. The rear gate 17 is provided with a pair of first lock mechanisms 41 configured to restrict rotational movement of the second panel 17B with the second panel 17B over the first panel 17A. The rear gate 17 is also provided with a pair of second lock mechanisms 42 configured to restrict rotational movement of the first panel 17A. As illustrated in FIGS. 1 and 6, the second lock mechanisms 42 include a pair of operation bars 42a so positioned at opposite lateral end portions of the first panel 17A as not to hinder rotational movement of the second panel 17B while the second lock mechanisms 42 is in the locking state. The pair of first lock mechanisms 41 and the pair of second lock mechanisms 42 are both at opposite lateral end portions of the rear gate 17 in left-right symmetry. The description below deals with the first lock mechanism 41 and the second lock mechanism 42 on the left side.

As illustrated in FIGS. 6 and 7, the first lock mechanism 41 is so positioned at a lateral end portion of the first panel 17A as not to hinder rotational movement of the second panel 17B. As illustrated in FIGS. 9A, 9B, 10A, and 10B, the first lock mechanism 41 includes (i) a semicircular rotational movement plate 41a fixed to the corresponding side face of the second panel 17B, (ii) a lock pin 41b configured to engage with the rotational movement plate 41a to lock the second panel 17B, (iii) a coil spring 41c urging the lock pin 41b toward the second panel 17B, (iv) an operation pin 41d fixed to the lock pin 41b, and (v) a support plate 41e fixed to the first panel 17A and having an L-shaped hole 41e1 configured to guide the operation pin 41d.

As illustrated in FIG. 10A, while the operation pin 41d is at that end of the L-shaped hole 41e1 which is close to the second panel 17B, the lock pin 41b is engaged with the rotational movement plate 41a due to the urging force of the coil spring 41c, so that the first lock mechanism 41 is in the locking state, that is, it restricts rotational movement of the second panel 17B. Moving the operation pin 41d in the locking state to that end of the L-shaped hole 41e1 which is apart from the second panel 17B against the urging force of the coil spring 41c as illustrated in FIG. 10B disengages the lock pin 41b from the rotational movement plate 41a, rendering the first lock mechanism 41 in the unlocking state. As illustrated in FIGS. 9A and 9B, the rotational movement plate 41a has a first hole 41a1 and a second hole 41a2 which are positioned symmetrically with respect to the first rotary shaft 32 and with each of which the lock pin 41b is capable of engaging.

The hold position illustrated in FIG. 3A is such that the rear gate 17 is folded into two (namely, the first panel 17A and the second panel 17B). Engaging the lock pin 41*b* with the first hole 41*a*1 in this position achieves a locked state as illustrated in FIG. 9A. The up position illustrated in FIG. 3B is such that the rotational movement plate 41*a* has been moved rotationally counterclockwise by 180 degrees about the first rotary shaft 32 together with the second panel 17B. Engaging the lock pin 41*b* with the second hole 41*a*2 in the up position achieves the locked state as illustrated in FIG. 9B.

Figure 11A:
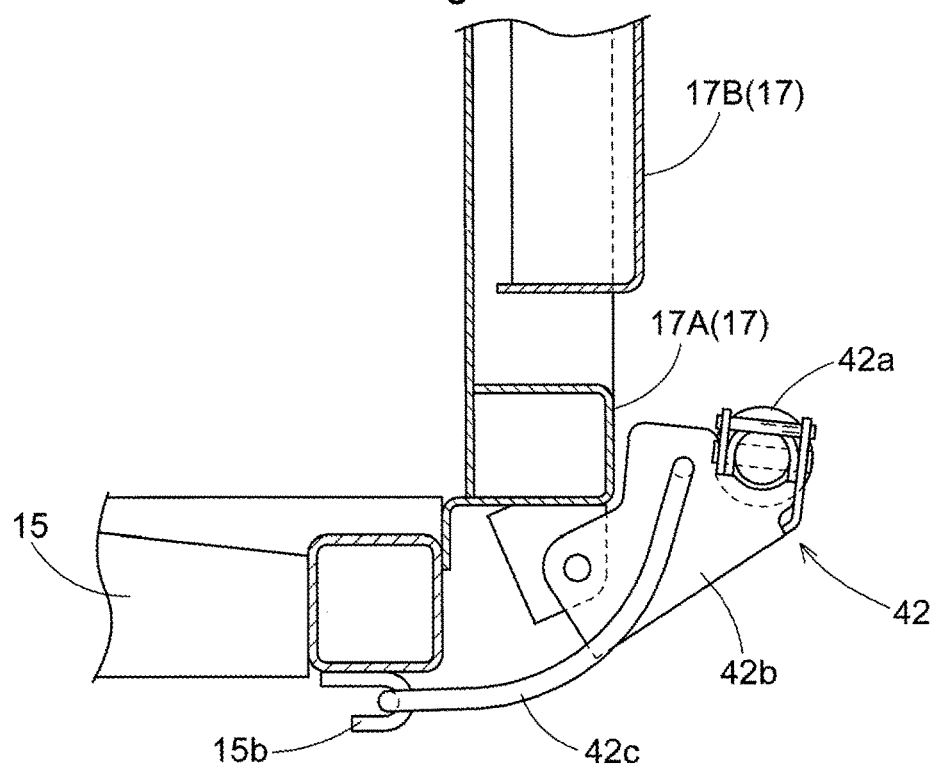
FIG. 11A is a plan view of a second lock mechanism in a locking state.
Figure 11B:
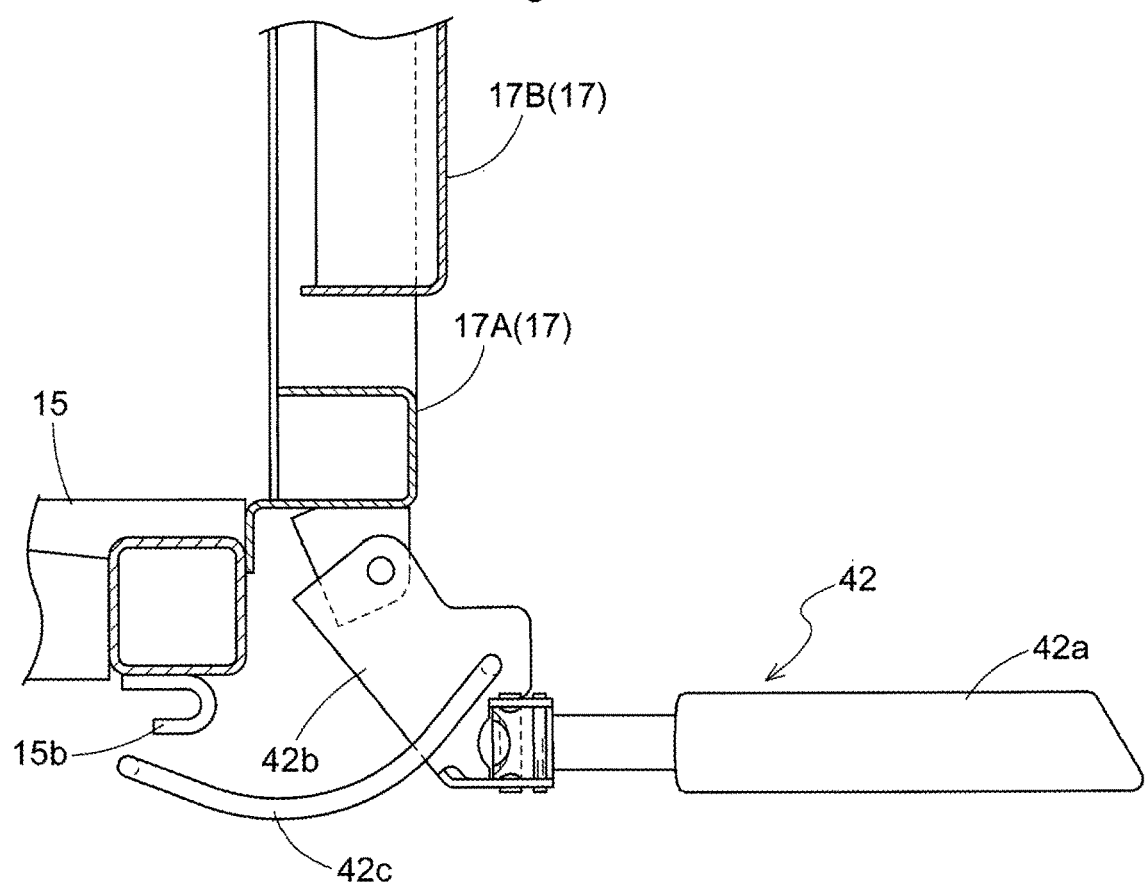
FIG. 11B is a plan view of a second lock mechanism in an unlocking state.

As illustrated in FIGS. 6 and 7, the second lock mechanism 42 is fixed to the corresponding lateral end portion of the first panel 17A. The second lock mechanism 42 includes an operation bar 42*a* as a handle, a support member 42*b* supporting the operation bar 42*a* in such a manner that the operation bar 42*a* is movable rotationally, and a loop-shaped latch 42*c* engageable with the support member 42*b*. The operation bar 42*a* is movable rotationally about the rotary shaft 42*b*1 of the support member 42*b* along the outer face of the first panel 17A. Moving the operation bar 42*a*, positioned at a lateral end portion of the first panel 17A and oriented in the up-down direction as illustrated in FIG. 11A, rotationally in the left-right direction away from the position indicated with a double-dashed chain line in FIG. 6 and then pulling the operation bar 42*a* backward into the position illustrated in FIG. 11B moves the support member 42*b* and the latch 42*c* outward. This achieves an unlocked state, in which the latch 42*c* is disengaged from a hook 15*b* fixed to the back end of the corresponding side panel 15. In this state, pushing the operation bar 42*a* forward moves the support member 42*b* and the latch 42*c* inward to achieve a locked state, in which the latch 42*c* is engaged with the hook 15*b*. In the locked state, the operation bar 42*a* is movable rotationally in the left-right direction about the rotary shaft 42*b*1 of the support member 42*b* and also in the up-down direction.

The first lock mechanisms 41 described above allow the second panel 17B to be stable, and are so positioned at opposite lateral end portions of the first panel 17A as not to hinder rotational movement of the second panel 17B, with the result of improved operability. Further, the operation bars 42*a*, which are for use to lock the first panel 17A, are so positioned at opposite lateral end portions of the first panel 17A as not to hinder rotational movement of the second panel 17B, with the result of improved operability. Unlocking the second lock mechanisms 42 involves moving each operation bar 42*a* rotationally along the outer face of the rear gate 17 and then moving it outward. This prevents an operator from rotationally moving the second panel 17B by mistake instead of the first panel 17A.

Alternative Embodiments (1) The embodiment described above is configured such that the side panels 15 are connected respectively with the entire lateral sides of the floor panel 14. The side panels 15 may alternatively be connected respectively with portions of the lateral sides of the floor panel 14. The embodiment described above is configured such that the front panel 16 is connected with the entire front side of the floor panel 14. The front panel 16 may alternatively be connected with a portion of the front side of the floor panel 14. The embodiment described above is configured such that the rear gate 17 is connected with the entire back side of the floor panel 14. The rear gate 17 may alternatively be connected with a portion of the back side of the floor panel 14. In other words, the carrier box 1B, which has a first dimension from its front end to its back end, may alternatively include a left side panel 15, a right side panel 15, and a floor panel 14 each extending in the front-back direction over at least a portion of the first dimension, a front panel 16 positioned at the front end of the carrier box 1B and extending over at least a portion of a second dimension between the left side panel 15 and the right side panel 15, and a rear gate 17 positioned at the back end of the carrier box 1B, extending over at least a portion of the second dimension, and movable to close the space defined by the left side panel 15, the right side panel 15, and the floor panel 14.

(2) The embodiment described above is configured such that the side panels 15 are provided with an engagement section 19 to which a plate-shaped member 20 such as a wooden frame is detachably attachable. The plate-shaped member 20 may, however, be replaced with any other height extension that the user prepares as desired to provide an additional height for each side panel 15. The engagement section 19 may be in the form of a hole(s) in an upper portion of a sufficiently thick side panel 15.

(3) The embodiment described above is configured such that the light 51 is in the form of a pair of inclined LED units 51*a* at respective upper corners of the support panel 52. The light 51 may, however, be in any form as long as the light 51 is at such a position on the lighting section 5 as to illuminate the winch 18. Further, the support panel 52 may alternatively be detachably attached to the ROPS frames 13.

(4) The work vehicle described above is not limited to a utility terrain vehicle (UTV), and may alternatively be, for example, a vehicle with a carrier box such as a pickup truck as long as the vehicle is capable of, for example, farmwork and transportation.

[Outline of Embodiment Described Above]

The description below outlines the work vehicle described above as an embodiment.

(1) A work vehicle, including: a carrier box including: a floor panel; a pair of left and right side panels; and a rear gate supported by the floor panel in such a manner as to be capable of being opened and closed, the side panels being provided with an engagement section to which a height extension is detachably attachable, the rear gate including: a first panel connected with the floor panel in such a manner as to be movable rotationally; and a second panel connected with the first panel in such a manner as to be movable rotationally, wherein attaching the height extension to the engagement section and positioning the second panel over the first panel provides an additional height for both of the side panels and the rear gate.

With the above configuration, after moving the second panel rotationally so that the second panel is over the first panel, simply attaching a height extension that is, for instance, prepared by the user to the engagement section on the side panels allows the carrier box to have an increased capacity. This means that the above configuration allows the user to change the capacity of the carrier box according to the type of load, thereby imparting greater convenience to the work vehicle.

(2) The work vehicle may be configured such that the engagement section is in a form of a plurality of insertion hole forming members which are provided for each of the side panels and in each of which a protrusion of the height extension is insertable.

With the above configuration, the engagement section is in the form of a plurality of insertion hole forming members in each of which a protrusion of the height extension is insertable. The engagement section is thus easily produced by simply fixing insertion hole forming members to the side panels of the carrier box.

(3) The work vehicle may be configured such that the insertion hole forming members provided for each of the side panels include at least one insertion hole forming member backward of a rear axle of the work vehicle.

With the above configuration, the insertion hole forming members on each side panel include at least one insertion hole forming member backward of the rear axle, thereby allowing the carrier box to have a further increased capacity.

(4) The work vehicle may be configured such that the insertion hole forming members are provided for the side panels in left-right symmetry.

Providing insertion hole forming members in left-right symmetry as with the above configuration allows the user to prepare identically shaped height extensions, thereby ensuring greater convenience.

(5) The work vehicle may be configured such that the insertion hole forming members each include: a bottom wall facing the floor panel; a facing wall facing a corresponding one of the side panels; and side walls connecting the facing wall with the respective side panels.

With the above configuration, each insertion hole forming member includes a bottom wall, a facing wall, and side walls. Such insertion hole forming members are easily produced.

(6) The work vehicle may be configured such that the facing wall has a through hole configured to receive a partition plate as inserted that is configured to partition a space of the carrier box.

With the above configuration, the facing wall has a through hole configured to receive a partition plate as inserted. This allows the user to change the capacity of the carrier box according to the type of load.

(7) The work vehicle may be configured such that the rear gate is provided with a first lock mechanism configured to restrict rotational movement of the second panel with the second panel over the first panel.

With the above configuration, the rear gate is provided with a first lock mechanism, which allows the second panel to be stable.

(8) The work vehicle may be configured such that the first lock mechanism is so positioned at a lateral end portion of the first panel as not to hinder the rotational movement of the second panel.

With the above configuration, the first lock mechanism is so positioned at a lateral end portion of the first panel as not to hinder rotational movement of the second panel, with the result of improved operability.

(9) The work vehicle may be configured such that the rear gate is provided with a second lock mechanism configured to restrict rotational movement of the first panel, and the second lock mechanism includes an operation bar for the first panel which operation bar is so positioned at a lateral end portion of the first panel as not to hinder rotational movement of the second panel while the second lock mechanism is in a locking state.

With the above configuration, the second lock mechanism includes an operation bar for use to lock the first panel which operation bar is so positioned at a lateral end portion of the first panel as not to hinder rotational movement of the second panel, with the result of improved operability.

(10) The work vehicle may be configured such that unlocking the second lock mechanism involves moving the operation bar rotationally along an outer face of the rear gate and then moving the operation bar outward.

Unlocking the second lock mechanism as with the above configuration prevents an operator from rotationally moving the second panel by mistake instead of the first panel.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present disclosure is not limited to those embodiments, and may be altered as appropriate, as long as such an alteration does not result in a failure to attain an object of the present disclosure.

The invention claimed is:
1. A work vehicle, comprising:
   a carrier box including:
      a floor panel;
      a pair of left and right side panels; and
      a rear gate supported by the floor panel in such a manner as to be capable of being opened and closed,
   the side panels being provided with an engagement section to which a height extension is detachably attachable,
   the rear gate including:
      a first panel connected with the floor panel in such a manner as to be movable rotationally; and
      a second panel connected with the first panel in such a manner as to be movable rotationally, wherein
   attaching the height extension to the engagement section and positioning the second panel over the first panel provides an additional height for both of the side panels and the rear gate, the rear gate is provided with a lock mechanism configured to restrict rotational movement of the first panel, and
   the lock mechanism includes an operation bar for the first panel which operation bar is so positioned at a lateral end portion of the first panel as not to hinder rotational movement of the second panel while the lock mechanism is in a locking state.

* * * * *